United States Patent [19]

Sato et al.

[11] Patent Number: 5,602,062
[45] Date of Patent: Feb. 11, 1997

[54] METHOD FOR PREPARING A BORON NITRIDE COMPOSITE

[75] Inventors: Tadao Sato, Ami; Milan Hubáček, Kawasaki, both of Japan

[73] Assignee: National Institute for Research in Inorganic Materials, Tsukuba, Japan

[21] Appl. No.: 535,816

[22] Filed: Sep. 28, 1995

[30] Foreign Application Priority Data

Jan. 18, 1995  [JP]  Japan .................................. 7-023509

[51] Int. Cl.$^6$ .............................................. C04B 35/5835
[52] U.S. Cl. .............................................. 501/96; 423/290
[58] Field of Search ................................ 501/96; 423/290

[56] References Cited

U.S. PATENT DOCUMENTS

| | | | |
|---|---|---|---|
| 4,784,978 | 11/1988 | Ogasawara et al. | 501/96 |
| 4,853,196 | 8/1989 | Koshida et al. | 501/96 X |
| 5,100,845 | 3/1992 | Montgomery | 423/290 |

FOREIGN PATENT DOCUMENTS

| | | |
|---|---|---|
| 1176208 | 7/1989 | Japan . |
| 1203205 | 8/1989 | Japan . |

*Primary Examiner*—Karl Group
*Attorney, Agent, or Firm*—Oblon, Spivak, McClelland, Maier & Neustadt, P.C.

[57] ABSTRACT

A method for preparing a boron nitride composite, which comprises heating a molten mixture of urea, boric acid and a metal element compound to obtain boron nitride having the metal element or the metal element compound dispersed and supported therein.

4 Claims, 1 Drawing Sheet

METHOD FOR PREPARING A BORON NITRIDE COMPOSITE

BACKGROUND OF THE INVENTION

FIELD OF THE INVENTION

The present invention relates to a method for producing a boron nitride composite. More particularly, it relates to a method for producing boron nitride (BN) containing a metal element as simple substance or its compound, which is useful for e.g. preparation of a sintered body of boron nitride.

DISCUSSION OF BACKGROUND

Boron nitride is excellent in heat resistance, corrosion resistance, lubricating properties, insulating properties, etc. and thus is a substance which can be used alone or as mixed with other substances. For example, a sintered body of a mixture of boron nitride and titanium boride is used as a composite material possessing electrical conductivity while possessing the characteristics of boron nitride, and a sintered product of a mixture of boron nitride with boric acid, or an oxide or nitride of e.g. calcium or silicon, added as a sintering assistant or adjuvant, is industrially used as a structural material.

The boron nitride containing such an additive i.e. the boron nitride composite, is prepared by mechanically mixing boron nitride with the additive component, whereby the mixed state reflects on the quality of the product. For example, if the amount of the additive is reduced to maximize the nature of boron nitride, uniform dispersion of the additive tends to be difficult, thus leading to deterioration of the strength due to non-uniformity of sintering. On the other hand, if the additive is used in a large amount, there has been a problem such that segregation is likely to occur.

On the other hand, one of the present inventors and his collaborators have previously found that magnesium boron nitride is effective as a catalyst for converting boron nitride to a high pressure phase, and they have further prepared a normal pressure phase boron nitride composite powder containing a very small amount of magnesium boron nitride and have developed a method for obtaining a light transmitting cubic system boron nitride sintered body by subjecting such a complex to high temperature high pressure treatment. At that time, they have invented also a method for diffusing magnesium from outside and impregnating the sintered body with it, as a method for dispersing and supporting a very small amount of magnesium boron nitride to a high level. However, even by using such a method, there still is a problem such that a gradient in concentration of magnesium appears towards the interior from the surface of boron nitride, and if a sample is large, it can not be impregnated to the interior, whereby conversion to cubic system boron nitride tends to be inadequate.

SUMMARY OF THE INVENTION

Under these circumstance, it is an object of the present invention to solve the above-mentioned problems of the prior art and to provide a common method for uniformly dispersing the additive.

The present invention provides, as a solution to the above problems, a method for preparing a boron nitride composite, which comprises heating a molten mixture of urea, boric acid and a metal element compound to obtain boron nitride having the metal element or the metal element compound dispersed and supported therein.

Further, the present invention provides additional features such that the molten mixture is heated at a temperature of from 200° C. to 2,300° C., and a nitrate is used as the above metal element compound. Furthermore, the present invention provides a boron nitride composite powder having fine copper grains with grain size of less than 5 μm dispersed and supported therein, prepared by the above method.

DETAILED DESCRIPTION OF THE PREFERRED EMBODIMENTS

Figure 1:
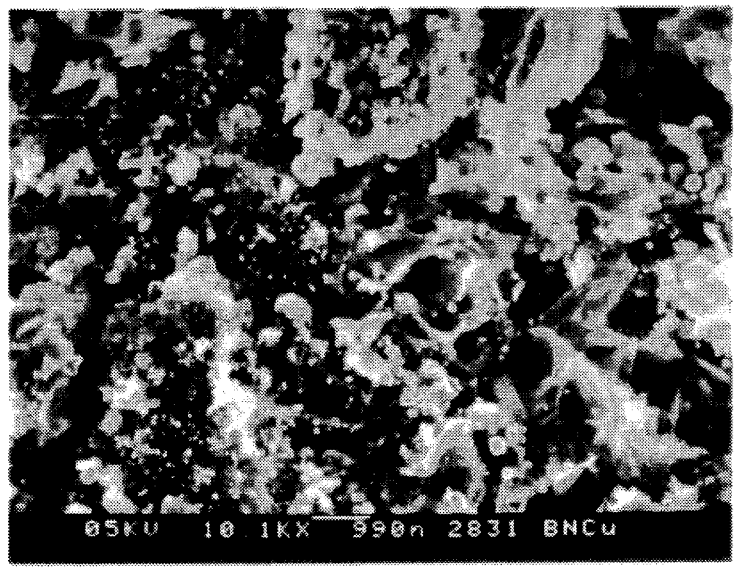
FIG. 1 is a scanning electron microscopic photograph showing boron nitride having fine copper particles dispersed and supported therein, as obtained in the Example of the present invention.

Heretofore, the problem of non-uniformity of a boron nitride composite powder has been attributable to the fact that boron nitride preliminarily synthesized has been used. In this connection, one of the present inventors and his collaborator have previously proposed in a study for synthesis of a boron carbonitride complex compound a method of gas phase thermal decomposition of a compound containing boron, nitrogen and carbon in an attempt to uniformly disperse carbon. However, to apply this method commonly, there has been a problem in the synthesis of the compound.

On the other hand, for the synthesis of boron nitride, a method has heretofore been known wherein a molten mixture of urea and boric acid is thermally decomposed, and many salts may be melted in such a molten mixture. In this invention, an attention has been drawn to a system of urea and boric acid, and a metal element compound is added to this system, followed by heating and melting for heat decomposition, whereby it has been made possible to prepare boron nitride and at the same time to make it complexed with the additive.

The metal element compound is basically the one which is soluble in the melt of urea and boric acid. Any metal element compound may be employed so long as it is mutually meltable with urea and boric acid.

As the metal, a typical element such as Mg, Ca, Al or Si, a noble element such as Cu or Ag, a transition metal element such as Ti, Y or Zr, or a rare earth element, may, for example, be used. As its compound, an inorganic salt such as a nitrate, or an organic salt, may suitably be used, since such a salt is readily decomposed by heat. Such a salt is advantageous also from the viewpoint that it is readily decomposed to form an oxide and reduced to form simple substance of metal, a carbide, a boride or a nitride.

As a typical example, copper or its nitrate may be mentioned. With respect to this typical example, a further description will be given in the Example given hereinafter.

In the present invention, a molten mixture of urea, boric acid and the metal element compound is heated preferably at a temperature of from 200° C. to 2,300° C. The blend ratio of these starting materials is usually 1:0.1 to 10:0.001 to 0.1 as a molar ratio.

When a reducing condition is preferred, urea is used in a large amount, and the metal element compound may be increased or reduced depending upon the particular purpose. The starting materials may be stirred and mixed, and the addition and mixing may be carried out in a suitable order. The heating operation is preferably conducted in an atmosphere of an inert gas, nitrogen or ammonia.

Now, the present invention will be described in further detail with reference to Example. However, it should be understood that the present invention is by no means restricted to such specific Example.

EXAMPLE

Boric acid, urea and copper nitrate trihydrate were mixed in a molar ratio of 1:2.5:0.1 and heated and melted at 150° C. While reducing the pressure by means of a diaphragm pump, the molten mixture was maintained at 200° C. for 3 hours, whereby the viscosity increased gradually and while foaming, the mixture solidified into a bluish solid. This solid was gently pulverized, then heated to 1,100° C. in an ammonia stream and maintained at that temperature for 2 hours to obtain a powdery substance. This substance was examined by an X-ray diffraction method, an X-ray microanalyzer and a scanning electron microscope, whereby it was found to be boron nitride of a turbostratic structure having fine copper particles with particle size of less than 0.1 μm dispersed and supported therein, as shown in FIG. 1.

This boron nitride was charged into a graphite crucible and heated to 1,950° C. and maintained at that temperature for one hour, to obtain hexagonal system boron nitride composed of crystallites having well developed contours.

Further, the above composite having a random layer-structure was heated to 1,950° C. under a pressure of 30 MPa, whereby a sintered body having a density of 97% and containing copper in the form of fine particles of at most 5 μm, was obtained. The orientation of boron nitride crystallites constituting this complex was different from the conventional orientation in that the plate-like broad plane was oriented in parallel with the axis for pressing.

The above facts indicate that the uniformly dispersed copper effectively acts as a crystallization assistant. Further, boron nitride is usually a substance which can hardly be sintered. Whereas, this composite powder can be readily press-sintered to obtain a sintered product which has a density of at least 97% and which has a crystal orientation different from the conventional orientation. This indicates that the finely dispersed copper acts as a specific sintering assistant.

As described in the foregoing, according to the present invention, it is possible to obtain a boron nitride composite i.e. boron nitride having a metal element uniformly dispersed and supported therein, by an extremely simple operation. Further, by the uniform dispersion, the additive can be utilized extremely effectively.

What is claimed is:

1. A method for preparing a boron nitride composite, which comprises heating a molten mixture of urea, boric acid and a metal element compound to obtain boron nitride having the metal element or the metal element compound dispersed and supported therein.

2. The method for preparing a boron nitride composite according to claim 1, wherein the molten mixture is heated at a temperature of from 200° C. to 2,300° C.

3. The method for preparing a boron nitride composite according to claim 1, wherein a nitrate capable of forming the molten mixture is used as the metal element compound.

4. A boron nitride composite having fine copper grains with grain size of less than 5 μm dispersed and supported therein.

* * * * *